United States Patent
Devarajan et al.

(10) Patent No.: US 7,881,228 B2
(45) Date of Patent: Feb. 1, 2011

(54) SYSTEM AND METHOD FOR BROADCAST PRUNING IN ETHERNET BASED PROVIDER BRIDGING NETWORK

(75) Inventors: Venkatavaradhan Devarajan, Bangalore (IN); Vijay Kannan, Bangalore (IN)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 12/206,753

(22) Filed: Sep. 9, 2008

(65) Prior Publication Data

US 2010/0020795 A1 Jan. 28, 2010

(51) Int. Cl.
H04L 12/28 (2006.01)

(52) U.S. Cl. ............... 370/254; 370/255; 370/256; 370/389

(58) Field of Classification Search .......... 370/254–256
See application file for complete search history.

(56) References Cited

U.S. PATENT DOCUMENTS

| | | | |
|---|---|---|---|
| 6,882,630 B1* | 4/2005 | Seaman ................ | 370/256 |
| 6,898,189 B1* | 5/2005 | Di Benedetto et al. ...... | 370/256 |
| 6,934,262 B1* | 8/2005 | Lau et al. .................. | 370/256 |
| 6,985,449 B2* | 1/2006 | Higashiyama ............. | 370/256 |
| 7,126,923 B1* | 10/2006 | Yang et al. ................ | 370/256 |
| 7,551,571 B2* | 6/2009 | Goldberg et al. .......... | 370/256 |
| 2004/0125803 A1* | 7/2004 | Sangroniz et al. ......... | 370/390 |
| 2004/0190454 A1* | 9/2004 | Higasiyama ............... | 370/238 |
| 2004/0218551 A1* | 11/2004 | Goldberg et al. .......... | 370/256 |
| 2009/0141717 A1* | 6/2009 | Cabeca et al. ............. | 370/389 |

* cited by examiner

*Primary Examiner*—Ayaz R Sheikh
*Assistant Examiner*—Mounir Moutaouakil

(57) ABSTRACT

A system and method for delivering multicast/broadcast data frames, originating in a service virtual local area network (S-VLAN), to a plurality of locations on a customer network is disclosed. In one embodiment, a method for delivering multicast/broadcast data frames includes analyzing ingress data frames, including customer virtual local area network identifiers (C-VIDs) associated with one or more divisions within one of a plurality of locations assigned by a customer network, received via incoming ports of each Ethernet switch associated with one of the plurality of locations and learning the C-VIDs of the ingress data frames, storing the learnt C-VIDs in the Ethernet switch, and forwarding the multicast/broadcast data frames to the one or more of the plurality of locations, via one or more outgoing ports of one or more of multiple Ethernet switches associated with the plurality of locations, based on the learnt and stored C-VIDs by each Ethernet switch.

11 Claims, 4 Drawing Sheets

SYSTEM AND METHOD FOR BROADCAST PRUNING IN ETHERNET BASED PROVIDER BRIDGING NETWORK

BACKGROUND

Applications, such as conferencing services that use multimedia streaming rely on broadcast/multicast data frames for data transmission. Data frames sent from one network entity but received by all entities within a particular bridged or domain network are referred to as broadcast data frames. Data frames sent from one entity and received by many (but not all) entities within a network domain are referred to as multicast data frames. These applications are generally bandwidth intensive and may place a significantly heavy load on the network, typically virtual local area network (VLAN) that they belong to. A VLAN is a group of networked devices that are in a separate broadcast domain even though they share a physical medium with other networked devices which do not belong to the VLAN. For example, a VLAN may comprise a number of local area network (LAN) segments which are on different ports of an Ethernet switch. The issue can get compounded if the VLAN happens to be distributed across multiple locations, such as an enterprise network including multiple offices in different locations that are interconnected using Metro Ethernet services, such as a provider bridging shown in FIG. 1.

One of the reasons for the heavy load being placed on the VLAN is due to forwarding of data frames based on a unique identifier, such as a service identifier (SID) by service provider networks. The SID is generally assigned by the service provider to the enterprise, without giving any consideration to the originating entity VLAN information within the enterprise.

For example, consider a common enterprise deployment scenario shown in FIG. 1, where the enterprise 100 has multiple locations (i.e., head office, branch office 1 and branch office 2), interconnected using a transport layer 2 connectivity solution, such as a provider backbone network 110, also referred to as a provider bridging. Each division within a branch office is associated with a unique customer virtual local area network identifier (C-VID), i.e., the same division across various branch offices has the same C-VID. Broadcast/multicast data frames sourced within a division, (e.g., a sales division in branch office 1) intended for sales divisions at other locations within the enterprise 100, traverse the provider backbone network 110 to get to intended destination(s). During run-time, upon receiving the data frames from one of the multiple locations at a port of one of Ethernet switches S1, S2, and S3, a pre-determined SID is associated with the data frames by the provider backbone network 110. The SID (and not the C-VID) is used within the provider backbone network 110 to forward the data frames to other locations. As a consequence, data frames destined from the sales division at the head office is forwarded by the provider backbone network 110 by making copies of each received data frame to both the branch offices 1 and 2, even though it is destined only to branch office 1. This can result in unnecessary traffic, going towards branch office 2 and hence can consume valuable network bandwidth of the service provider as well as result in unnecessary network utilization by the enterprise 100.

It can be seen that in such an enterprise deployment scenario, provider backbone networks 110 using the transport Layer 2 connectivity solution can flood these broadcast data frames to all locations in the enterprise 100. In many instances, enterprise networks do not have identical VLAN setup across multiple data frames to all locations, and can flood these broadcast/multicast frames to all locations which will result in wastage of bandwidth in the provider backbone network 110 as well as superfluous network utilization by the enterprise 100.

BRIEF DESCRIPTION OF THE DRAWINGS

Embodiments of the present invention are illustrated by way of examples and are not limited to the figures of the accompanying drawings, in which like references indicate similar elements and in which.

Other features of the present embodiments will be apparent from the accompanying drawings and from the detailed description that follows.

DETAILED DESCRIPTION

A system and method for broadcast pruning in Ethernet based provider bridging network is disclosed. In the following description, for purposes of explanation, numerous specific details are set forth in order to provide a thorough understanding of the various embodiments. It will be evident, however, to one skilled in the art that the various embodiments may be practiced without these specific details.

The terms "broadcast pruning", "multicast pruning", and "broadcast limiting" are used interchangeably throughout the document. Also, the terms "S-VLAN", "Layer2 network", and "provider network" are used interchangeably throughout the document. Further, the term "S-VLAN" refers to VLANs of a provider network or Ethernet based provider bridging network. Furthermore, the term "customer network" refers to an enterprise based network including multiple locations, a user network including multiple locations, and so on. The term "data frames" includes multicast data frames, broadcast data frames and unicast data frames. In addition, the terms "broadcast data frames" and "multicast data frames" are used interchangeably throughout the document. Moreover, the term "broadcast/multicast data frames" refers to both "broadcast data frames" and "multicast data frames".

Figure 1:
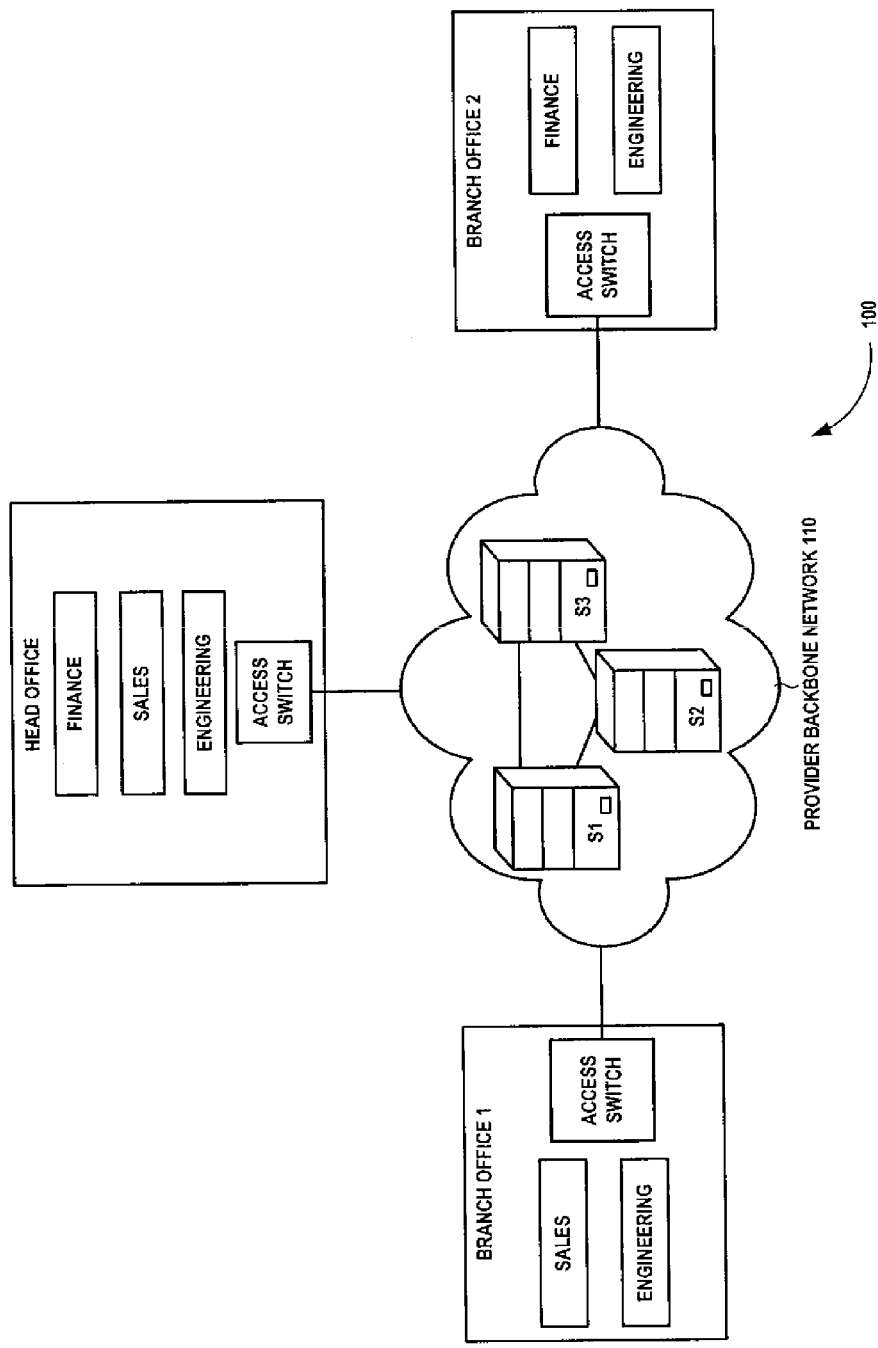
FIG. 1 shows a block diagram of a provider bridged virtual local area network (VLAN) for delivering multicast/broadcast data frames in the context of the invention.
Figure 2:
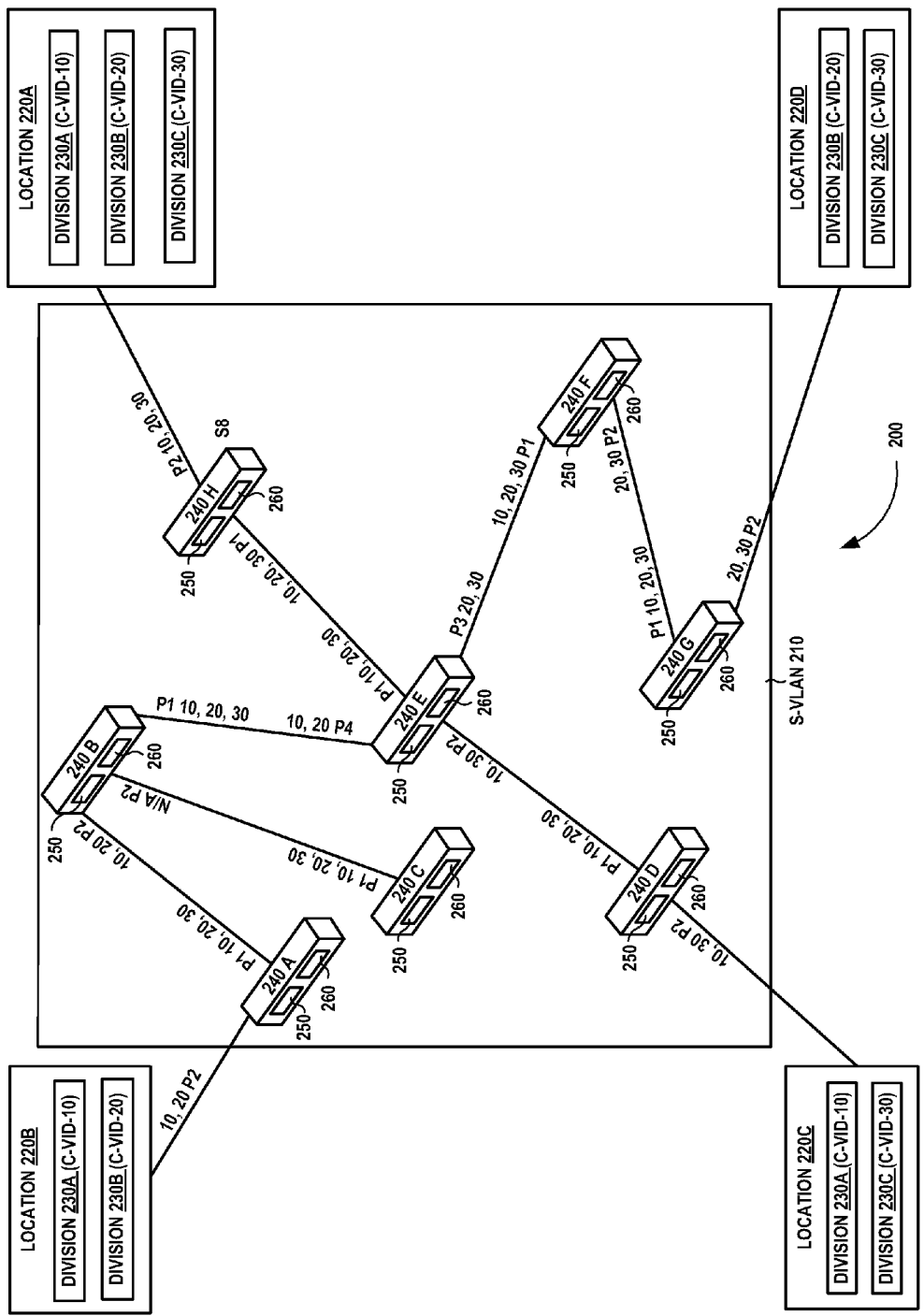
FIG. 2 shows a block diagram illustrating major components of a framework for delivering multicast/broadcast data frames originating from a location via a service virtual local area network (S-VLAN) to a plurality of locations within a customer network, according to one embodiment.

FIG. 2 shows a block diagram 200 illustrating major components of a framework for delivering multicast/broadcast data frames originating from a location 220A (e.g., head office) via a service virtual local area network (S-VLAN) 210 to a plurality of locations 220B-D (e.g., branch offices) within a customer network, according to one embodiment.

Particularly, FIG. 2 illustrates a system 200 for broadcast pruning in an Ethernet based provider bridging network. In one embodiment, the Ethernet based provider bridging network includes the customer network communicatively connected to the S-VLAN 210 (e.g., a provider network). Further, the customer network includes the plurality of locations 220A-D. As shown in FIG. 2, each of the plurality of locations 220A-D includes one or more divisions 230A-C. Furthermore, the S-VLAN 210 includes multiple Ethernet switches 240A-H. In the example embodiment illustrated in FIG. 2, the plurality of locations 220A-D is communicatively connected to the multiple Ethernet switches 240A-H. In one embodiment, the Ethernet switch 240 includes multiple incoming ports and multiple outgoing ports, a customer virtual local area network (C-VID) learning module 250 and memory 260 associated with the C-VID learning module 250.

In operation, ingress data frames are received via the incoming port of the Ethernet switch 240H associated with one of the plurality of the location 220A-D. In some embodiments, the ingress data frames includes customer virtual local area network identifiers (C-VIDs) (e.g., assigned by the customer network) associated with the one or more divisions 230A-C within the plurality of locations 220A-D. Further, the C-VID learning module 250 analyzes the ingress data frames for learning the C-VIDs in the ingress data frames.

In one embodiment, the C-VID learning module 250 statically learns the C-VIDs associated with the one or more divisions 230A-C within one of the plurality of locations 220A-D upon analyzing the ingress data frames received via the incoming ports of the one of the multiple Ethernet switches 240A-H. In this embodiment, statically learning of the C-VIDs is based on user configuration of the Ethernet switches 240A-H.

In another embodiment, the C-VID learning module 250 associated with each Ethernet switch 240 dynamically learns the C-VIDs associated with the one or more divisions 230A-C within the plurality of locations 220A-D assigned by the customer network upon analyzing the ingress data frames received via the incoming ports of the one of the multiple Ethernet switches 240A-H. It is appreciated that, in the dynamically learning of the C-VIDs, the C-VID learning module 250 learns the C-VIDs for each service identifier (SID) based on customer network control frames supplemented by the data frames that ingress the S-VLAN 210.

In one example embodiment, the customer network control frames that are used for dynamically learning of the C-VIDs may include generic VLAN registration protocol (GVRP), link layer discovery protocol (LLDP), multiple spanning tree protocol (MSTP) or any other protocol that carries C-VID information associated with the one or more divisions 230A-C. In this embodiment, the dynamically learning of the C-VIDs is achieved in two ways, i.e., by having all the Ethernet switches 240A-H snoop the customer network control frames or by having the Ethernet switch 240 at the edge of the S-VLAN 210 snoop the customer network control frames and subsequently use a proprietary protocol within the S-VLAN 210 to propagate the information.

It is appreciated that the broadcast pruning gets initiated on the Ethernet switch 240 only after it receives a first control frame on the same Ethernet switch 240. It can be noted that, there is a possibility that the Ethernet switch 240 receives a data frame for a certain C-VID which is not learnt before, through a control frame. In this case, learning may occur on the data frames similar to learning of medium access control (MAC) address.

In some embodiments, the learnt C-VIDs are stored in the memory 260. Further, the C-VID learning module 250 forwards the multicast/broadcast data frames to the one or more of the plurality of locations 220B-D via one or more of the outgoing ports of one or more of the multiple Ethernet switches 240A-H associated with the plurality of locations 220A-D based on the learnt and stored C-VIDs by each Ethernet switch 240 associated with one of the plurality of locations 220A-D. It should be noted that the multicast/broadcast data frames are forwarded only to those ports on the SVLAN 210 that have learnt customer VLAN (C-VLAN).

As illustrated in FIG. 2, the customer network includes a plurality of locations 220A-D. In the example embodiment illustrated in FIG. 2, the location 220A is a head office, and the locations 220B-D are branch offices 1, 2, and 3 respectively. It can be seen from FIG. 2 that, each of the locations 220A-D includes divisions 230A-C. Further, it should be noted that, all the divisions 230A-C may or may not exist in all the locations 220A-D associated with the customer network. As illustrated in FIG. 2, the location 220A includes divisions 230A-C, the location 220B includes divisions 230A-B, the location 220C includes divisions 230A and 230C and the location 220D includes divisions 230B and 230 C. Further, C-VID—'10' is assigned to the division 230A; C-VID—'20' is assigned to the division 230B and C-VID—'30' is assigned to the division 230C, according to the example embodiment illustrated in FIG. 2.

For example, consider a scenario where no broadcast pruning occurs in delivering the multicast/broadcast data frames via the S-VLAN 210. In this scenario, broadcast data frames from the division 230A at the location 220A destined to the divisions 230A within other locations 220B-D take the paths:
1. 240H-240E-240B-240A to location 220B
2. 240H-240E-240D to location 220C
3. 240H-240E-240F-240G to location 220D It can be seen from FIG. 2 that, the location 220D does not include the division 230A. However, the broadcast data frames destined to the division 230A are received by the location 220D. Also, a similar kind of scenario can be extended to other divisions 230B-C, resulting in wasted bandwidth in the S-VLAN 210. The wastage may occur every time when there is a broadcast/multicast data frame traversing the S-VLAN 210 and also if there is a destination lookup failure for unicast MAC-address within the S-VLAN 210.

In order to correctly distribute the multicast/broadcast data frames in the S-VLAN 210, the broadcast pruning is performed according to the preferred embodiments of the present invention. In some embodiments, the multiple Ethernet switches 240A-H identifies all extraneous paths for a given broadcast data frame such that the multiple Ethernet switches 240A-H can avoid forwarding them along such channels. In these embodiments, to identify all the extraneous paths, the C-VID learning module 250 of the Ethernet switch 240 learns (e.g., statically or dynamically learns) the C-VIDs (that it can expect to receive traffic from). Further, the learnt C-VIDs are stored in the memory 260 of the Ethernet switch 240. In one exemplary implementation, the multiple Ethernet switches 240A-H filter out the ports to forward multicast/broadcast data frames using the learnt and stored C-VIDs.

With reference to FIG. 2, the learning of C-VIDs at the ports on the multiple Ethernet switches 240A, 240D, 240G and 240H associated with the plurality of locations 220A-D occurs as follows:
1. Port P2 on the Ethernet switch 240H learns C-VIDs 10, 20, 30
2. Port P2 on the Ethernet switch 240G learns C-VIDs 20, 30
3. Port P2 on the Ethernet switch 240D learns C-VIDs 10, 30
4. Port P2 on the Ethernet switch 240A learns C-VIDs 10, 20

Further, this information is propagated into the S-VLAN 210, based on topology. For example, the ports of the Ethernet Switch 240E learn the C-VIDs as follows:
1. Port P1 learns C-VIDs 10, 20, 30
2. Port P2 learns C-VIDs 10, 30
3. Port P3 learns C-VIDs 20, 30 and
4. Port P4 learns C-VIDs 10, 20

In accordance with the above-described embodiments, the data frames from the division 230A at the location 220A are broadcasted at a steady state. The data frames from the location 220A reach port P2 on the Ethernet switch 240H, and get switched out to port P1 as the port P1 has learnt the C-VID '10' associated with the division 230A. Further, the port P1 on the Ethernet switch 240H forwards the data frames to the port P1 on the Ethernet switch 240E, which switches the data frame to ports P2 and P4 and not to port P3 as the port P3 has not learnt C-VID—'10' associated with the division 230A. In a similar manner, data path to the Ethernet switch 240C is also pruned out and the data frames go to desired destinations only. Further, it can be noted that the broadcast pruning of data path can be implemented on a device as an egress filter in device hardware.

Further, it is appreciated that unlike learn process of MAC address on a port, learning of C-VIDs is not subjected to moves as same C-VID may exist on multiple ports. Also, it should be noted that broadcast pruning does not alter switch behavior with respect to flooding but only limits it to a subset of relevant paths. One skilled in the art will appreciate that, the broadcast pruning does not cause any impact on the broadcast/multicast data frames that are VLAN-agnostic like bridge protocol data units (BPDU) frames.

In some embodiments, aging out (or unlearning) of stale C-VIDs may occur, when customer network configuration changes and/or when the stored C-VIDs are no longer in use. In this case, the ports of the Ethernet switch 240 flushes all the C-VIDs and disable broadcast pruning if the Ethernet switch 240 does not receive any customer network control frame advertisement within a specified time interval. Further, it is appreciated that the above-described technique does not require any additional protocol or feature capability within the S-VLAN 210.

Figure 3:
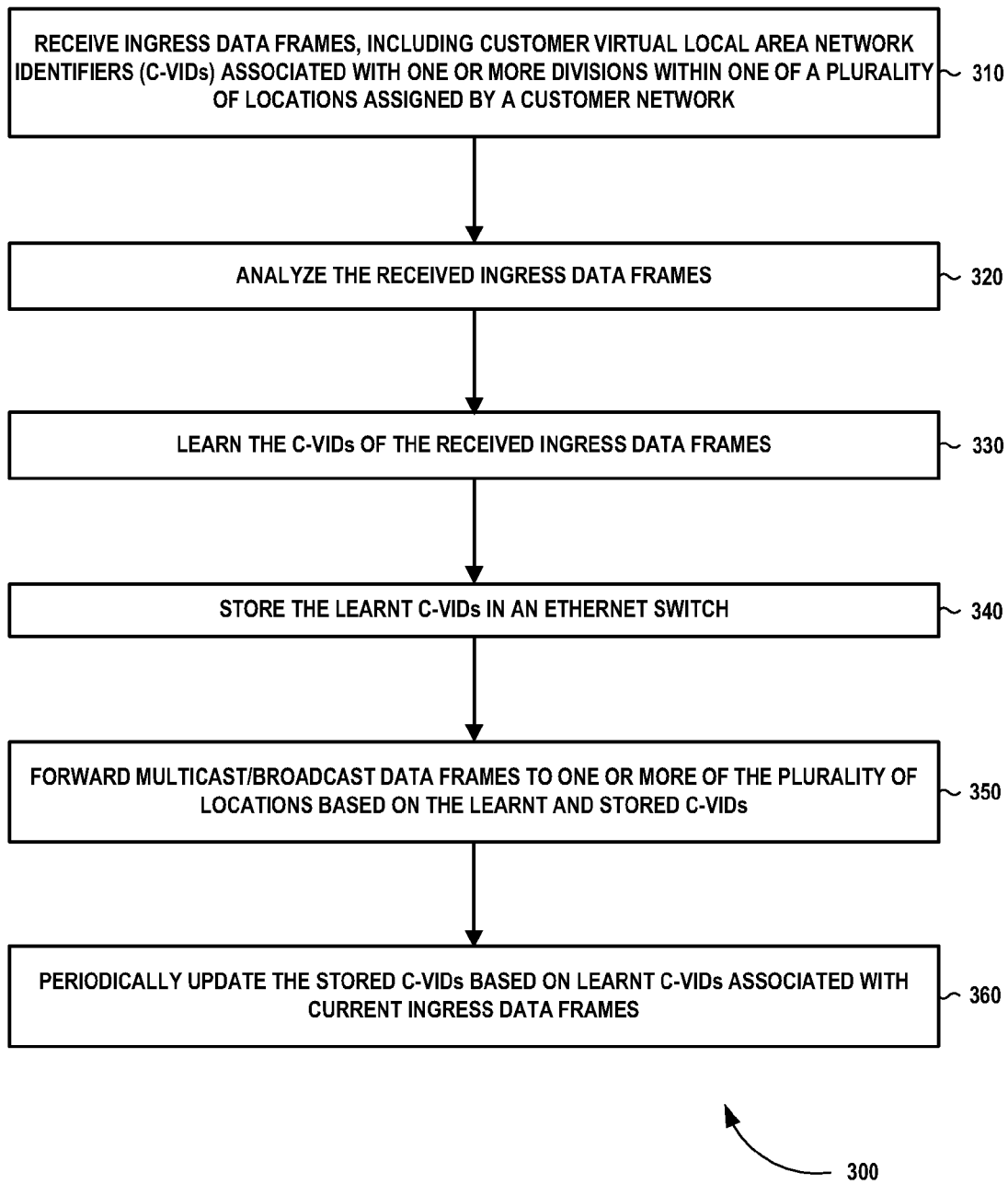
FIG. 3 shows a process flow of delivering the multicast/broadcast data frames to the plurality of locations within the customer network connected via the S-VLAN, according to one embodiment.

FIG. 3 shows a process flow 300 of delivering multicast/broadcast data frames to a plurality of locations 220A-D within a customer network connected via an S-VLAN 210, according to one embodiment. In some embodiments, the S-VLAN 210 includes multiple Ethernet switches 240A-H communicatively coupled to the plurality of locations 220A-D within the customer network.

In step 310, ingress data frames, including C-VIDs associated with one or more divisions 230A-C within one of the plurality of locations 220A-D assigned by the customer network, are received. In some embodiments, the ingress data frames are received via the incoming ports of one of the multiple Ethernet switches 240A-H associated with the one of the plurality of locations 220A-D. In step 320, the received ingress data frames are analyzed (e.g., by the C-VID learning module 250 of FIG. 2). In step 330, the C-VIDs of the received ingress data frames are learnt (e.g., by the C-VID learning module 250 of FIG. 2) based on the analyzed ingress data frames.

In one embodiment, learning the C-VIDs of the ingress data frames includes statically learning the C-VIDs associated with the one or more divisions 230A-C within the one of the plurality of locations 220A-D assigned by the customer network upon analyzing the ingress data frames received via the incoming ports of the one of the multiple Ethernet switches 240A-H. In another embodiment, learning the C-VIDs of the ingress data frames includes dynamically learning the C-VIDs associated with the one or more divisions 230A-C within the one of the plurality of locations 220A-D assigned by the customer network upon analyzing the ingress data frames received via the incoming ports of the one of the multiple Ethernet switches 240A-H. In this embodiment, the C-VIDs of the ingress data frames are dynamically learnt by each Ethernet switch 240. In one embodiment, each Ethernet switch 240 is either an Ethernet switch associated with one of the plurality location 220A-D or an Ethernet switch in the S-VLAN 210.

In step 340, the learnt C-VIDs are stored in the Ethernet switch 240. In one exemplary implementation, the learnt C-VIDs are stored in memory 260 of the Ethernet switch 240. In step 350, multicast/broadcast data frames are forwarded to the one or more of the plurality of locations 220A-D based on the learnt and stored C-VIDs by each Ethernet switch 240 associated with the one of the plurality of locations 220A-D. In some embodiments, the multicast/broadcast data frames are forwarded via one or more outgoing ports of one or more of the multiple Ethernet switches 240A-H associated with the plurality of locations 220A-D. In step 360, the stored C-VIDs in each Ethernet switch 240 are periodically updated based on learnt C-VIDs associated with current ingress data frames.

Figure 4:
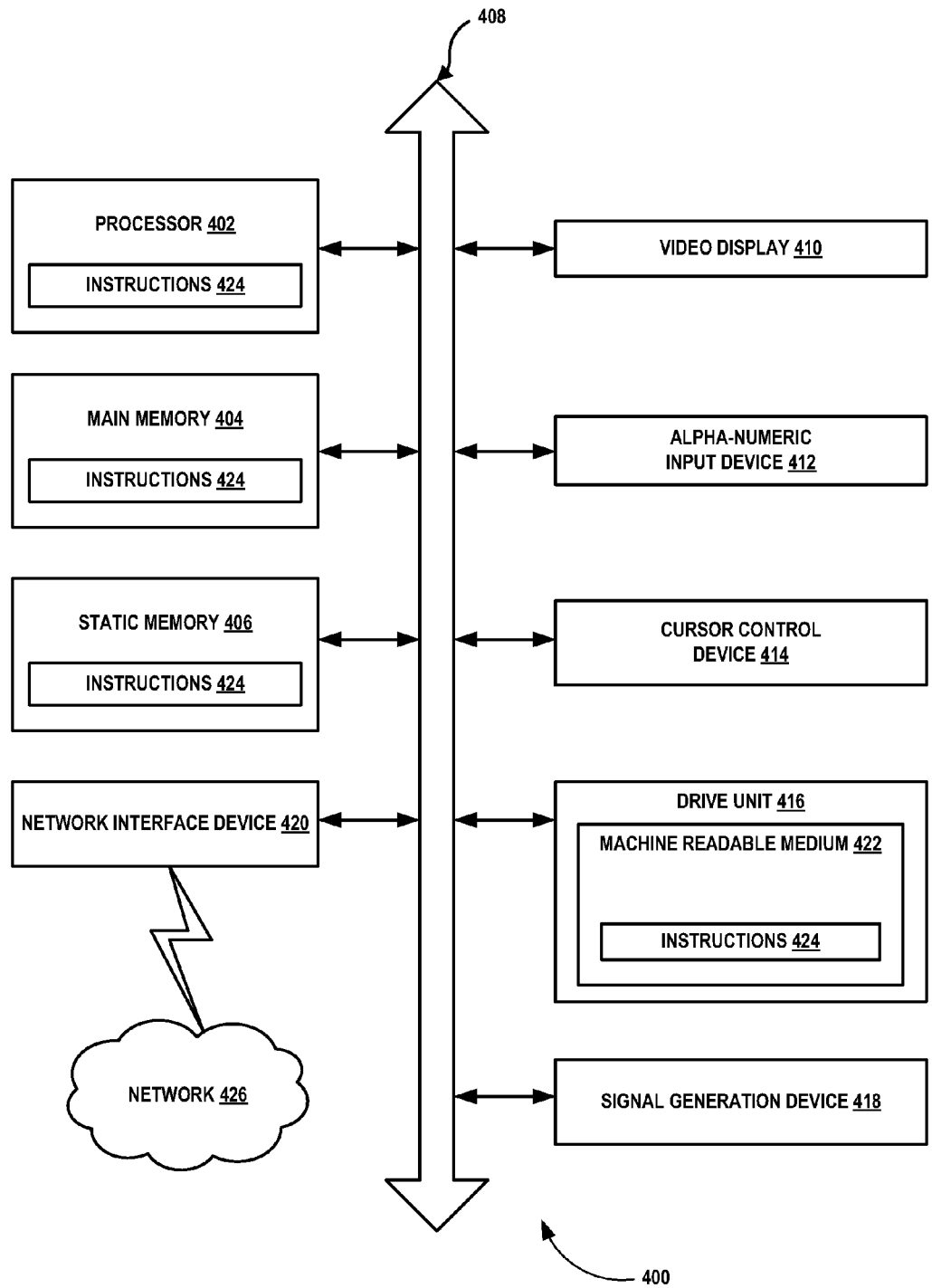
FIG. 4 shows a diagrammatic system view of a data processing system in which any of the embodiments disclosed herein may be performed, according to one embodiment.

FIG. 4 illustrates a diagrammatic system view 400 of a data processing system in which any of the embodiments disclosed herein may be performed, according to one embodiment. Particularly, the diagrammatic system view of FIG. 4 illustrates a processor 402, a main memory 404, a static memory 406, a bus 408, a video display 410, an alpha-numeric input device 412, a cursor control device 414, a drive unit 416, a signal generation device 418, a network interface device 420, a machine readable medium 422, instructions 424 and a network 426.

The diagrammatic system view 400 may indicate a personal computer and/or a data processing system in which one or more operations disclosed herein are performed. The processor 402 may be a microprocessor, a state machine, an application specific integrated circuit, a field programmable gate array, etc. The main memory 404 may be a dynamic random access memory and/or a primary memory of a computer system. The static memory 406 may be a hard drive, a flash drive, and/or other memory information associated with the data processing system.

The bus 408 may be an inter-connection between various circuits and/or structures of the data processing system. The video display 410 may provide graphical representation of information on the data processing system. The alpha-numeric input device 412 may be a keypad, keyboard and/or any other input device of text (e.g., a special device to aid the physically handicapped). The cursor control device 414 may be a pointing device such as a mouse. The drive unit 416 may be a hard drive, a storage system, and/or other longer term storage subsystem.

The signal generation device 418 may be a bios and/or a functional operating system of the data processing system. The network interface device 420 may perform interface functions (e.g., code conversion, protocol conversion, and/or buffering) required for communications to and from the network 426 between a number of independent devices (e.g., of varying protocols). The machine readable medium 422 may provide instructions on which any of the methods disclosed herein may be performed. The instructions 424 may provide source code and/or data code to the processor 402 to enable any one or more operations disclosed herein.

For example, a storage medium having instructions, that when executed by a computing platform, result in execution of a method for delivering multicast/broadcast data frames originating from one of a plurality of locations 220A-D via an S-VLAN 210 (e.g., that includes multiple Ethernet switches 240A-H communicatively coupled to the plurality of locations 220A-D within a customer network) to one or more of the plurality of locations 220A-D within the customer network including analyzing ingress data frames (e.g., including C-VIDs associated with one or more divisions 230A-C within the one of the plurality of locations 220A-D assigned by the customer network) received via incoming ports of each Ethernet switch 240 associated with the one of the plurality of locations 220A-D, learning the C-VIDs of the ingress data frames and storing the learnt C-VIDs in the Ethernet switch 240, and forwarding the multicast/broadcast data frames to the one or more of the plurality of locations 220A-D, via one or more outgoing ports of one or more of the multiple Ethernet switches 240A-H associated with the plurality of locations 220A-D, based on the learnt and stored C-VIDs by each Ethernet switch 240 associated with the one of the plurality of locations 220A-D.

The storage medium may also have instructions to receive the ingress data frames including the C-VIDs associated with the one or more divisions 230A-C within the one of the plurality of locations 220A-D assigned by the customer network via the incoming ports of one of the multiple Ethernet switches 240A-H associated with the one of the plurality of locations 220A-D. In one embodiment, learning the C-VIDs of the ingress data frames includes statically learning the C-VIDs associated with the one or more divisions 230A-C within the one of the plurality of locations 220A-D assigned by the customer network upon analyzing the ingress data frames received via the incoming ports of the one of the multiple Ethernet switches 240A-H. In another embodiment, learning the C-VIDs of the ingress data frames includes dynamically learning the C-VIDs associated with the one or more divisions 230A-C within the one of the plurality of locations 220A-D assigned by the customer network upon analyzing the ingress data frames received via the incoming ports of the one of the multiple Ethernet switches 240A-H. Further, the storage medium may have instructions to periodically update the stored C-VIDs in each Ethernet switch 240 based on learnt C-VIDs associated with current ingress data frames.

The above-described technique significantly reduces wastage of service provider bandwidth by preventing flooding of data frames on extraneous data paths. The above technique enhances bandwidth utilization within a customer network running on applications, such as address resolution protocol (ARP), net BIOS name server (NBNS), user datagram protocol (UDP) broadcast like dynamic host configuration protocol (DHCP) and so on, routing protocol frames, such as open shortest path first protocol (OSPF) and protocol independent multicast (PIM), UDP multicast like real-time transport protocol (RTP) and other multicast streaming applications, and Layer 2 destination lookup failures. Further, the above technique reduces number of MAC address learnings required within a service provider network. Due to broadcast pruning, not all network devices see all the data frame traffic and therefore the MAC address learning happens substantially only on data frames forwarded, based on C-VIDs.

Further, the foregoing described method may be in a form of a machine-readable medium embodying a set of instructions that, when executed by a machine, cause the machine to perform any method disclosed herein. It will be appreciated that the various embodiments discussed herein may not be the same embodiment, and may be grouped into various other embodiments not explicitly disclosed herein.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method for delivering multicast/broadcast data frames originating from one of a plurality of locations via a service virtual local area network (S-VLAN) to one or more of the plurality of locations within a customer network and wherein, the S-VLAN includes multiple Ethernet switches communicatively coupled to the plurality of locations within the customer network, comprising:

analyzing ingress multicast/broadcast data frames, including customer virtual local area network identifiers (C-VIDs) that identify one or more divisions within the plurality of locations, wherein the ingress multicast/broadcast data frames are received via at least one incoming port of at least one of the multiple Ethernet switches;

learning the C-VIDs of the ingress multicast/broadcast data frames via a learning module of the at least one of the multiple Ethernet switches;

storing the learnt C-VIDs in the at least one of the multiple Ethernet switches; and forwarding the ingress multicast/broadcast data frames to only those of the plurality of locations that include the one or more divisions identified by the C-VIDs included in the ingress multicast/broadcast data frames, via one or more outgoing ports of the at least one of the multiple Ethernet switches, based on the learnt and stored C-VIDs.

2. The method of claim 1, wherein learning the C-VIDs of the ingress multicast/ibroadcast data frames comprises:

statically learning the C-VIDs that identify the one or more divisions within the plurality of locations upon analyzing the ingress multicast/broadcast data frames.

3. The method of claim 1, wherein learning the C-VIDs of the ingress multicast/broadcast data frames comprises:

dynamically learning the C-VIDs that identify the one or more divisions within the plurality of locations upon analyzing the ingress multicast/broadcast data frames.

4. The method of claim 1, further comprising:

periodically updating the stored C-VIDs in the at least one of the multiple Ethernet switches based on learnt C-VIDs associated with current ingress multicast/broadcast data frames.

5. An article, comprising:

a storage medium having instructions, that when executed by a computing platform, result in execution of a method for delivering multicast/broadcast data frames originating from one of a plurality of locations via a service virtual local area network (S-VLAN) to one or more of the plurality of locations within a customer network and wherein, the S-VLAN includes multiple Ethernet switches communicatively coupled to the plurality of locations within the customer network comprising:

analyzing ingress multicast/broadcast data frames; including customer virtual local area network identifiers (C-VIDs) that identify one or more divisions within the plurality of locations, wherein the ingress multicast/broadcast data frames are received via at least one incoming port of at least one of the multiple Ethernet switches;

learning the C-VIDs of the ingress multicastlbroadcast data frames via a learnin module of the at least one of the multiple Ethernet switches;

storing the learnt C-VIDs in the at least one of the multiple Ethernet switches; and forwarding the ingress multicast/broadcast data frames only those of the plurality of locations that include the one or more divisions identified by the C-VIDs included in the ingress multicast/broadcast data frames, via one or more outgoing ports of the at least one of the multiple Ethernet switches, based on the learnt and stored C-VIDs.

6. The article of claim 5, wherein learning the C-VIDs of the ingress multicast/broadcast data frames comprises:
statically learning the C-VIDs that identify the one or more divisions within the plurality of locations upon analyzing the ingress multicast/broadcast data frames.

7. The article of claim 5, wherein learning the C-VIDs of the ingress multicast/broadcast data frames comprises:
dynamically learning the C-VIDs that identify the one or more divisions within the plurality of locations upon analyzing the ingress multicast/broadcast data frames.

8. The article of claim 5, further comprising:
periodically updating the stored C-VIDs in the at least one of the multiple Ethernet switches based on learnt C-VIDs associated with current ingress multicast/broadcast data frames.

9. A system for broadcast pruning data frames in an Ethernet based provider bridging network, comprising:
a customer network;
a provider network communicatively connected to the customer network and wherein the customer network includes a plurality of locations, wherein each location includes one or more divisions, wherein the provider network includes multiple Ethernet switches and wherein the plurality of locations is communicatively coupled to the multiple Ethernet switches and wherein each Ethernet switch comprising:
multiple incoming ports and multiple outgoing ports;
a customer virtual local area network identifier (C-VID) learning module; and
memory associated with the C-VID learning module, wherein the C-VID learning module is configured to:
analyze ingress multicast/broadcast data frames, including customer virtual local area network identifiers (C-VIDs) that identify at least one of the one or more divisions within the plurality of locations , wherein the ingress multicast/broadcast data frames are received via at least one of the multiple incoming ports,
learn the C-VIDs associated with the ingress multicast/broadcast data frames,
store the learnt C-VIDs in the memory, and
forward the ingress multicast/broadcast data frames to only those of the plurality of locations that include the one or more divisions identified by the C-ViDs included in the ingress multicast/broadcast data frames, via one or more of the multiple outgoing ports based on the learnt and stored C-VIDs.

10. The system of claim 9, wherein the C-VID learning module statically learns the C-VIDs that identify at least one of the one or more divisions within the plurality of locations upon analyzing the ingress multicast/broadcast data frames.

11. The system of claim 9, wherein the C-VID learning module associated with each Ethernet switch dynamically learns the C-VIDs that identify at least one of the one or more divisions within the plurality of locations upon analyzing the ingress multicast/broadcast data frames.

* * * * *

UNITED STATES PATENT AND TRADEMARK OFFICE
CERTIFICATE OF CORRECTION

PATENT NO. : 7,881,228 B2  
APPLICATION NO. : 12/206753  
DATED : February 1, 2011  
INVENTOR(S) : Venkatavaradhan Devarajan et al.

Page 1 of 1

It is certified that error appears in the above-identified patent and that said Letters Patent is hereby corrected as shown below:

In column 8, line 31, in Claim 2, delete "multicast/ibroadcast" and insert -- multicast/broadcast --, therefor.

In column 8, line 56, in Claim 5, delete "frames;" and insert -- frames, --, therefor.

In column 8, line 63, in Claim 5, delete "multicastlbroadcast" and insert -- multicast/broadcast --, therefor.

In column 8, line 64, in Claim 5, delete "learnin" and insert -- learning --, therefor.

In column 10, line 9, in Claim 9, delete "locations ," and insert -- locations, --, therefor.

In column 10, line 19, in Claim 9, delete "C-ViDs" and insert -- C-VIDs --, therefor.

Signed and Sealed this  
Eleventh Day of September, 2012

David J. Kappos  
*Director of the United States Patent and Trademark Office*